US010882622B2

United States Patent
Zahnow

(10) Patent No.: US 10,882,622 B2
(45) Date of Patent: Jan. 5, 2021

(54) METHOD AND SYSTEM FOR THE VENTILATION OF AN AIRCRAFT AREA

(71) Applicant: Airbus Operations GmbH, Hamburg (DE)

(72) Inventor: Jens Zahnow, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 222 days.

(21) Appl. No.: 15/247,072

(22) Filed: Aug. 25, 2016

(65) Prior Publication Data
US 2016/0362182 A1 Dec. 15, 2016
US 2020/0361610 A9 Nov. 19, 2020

(30) Foreign Application Priority Data

Aug. 28, 2015 (DE) .................. 10 2015 216 499

(51) Int. Cl.
*B64D 13/00* (2006.01)
*B64D 13/02* (2006.01)
(52) U.S. Cl.
CPC ............... *B64D 13/02* (2013.01); *Y02T 50/50* (2013.01)
(58) Field of Classification Search
CPC ............................... B64D 13/02; Y02T 50/50
USPC ......................................................... 454/76
See application file for complete search history.

(56) References Cited

U.S. PATENT DOCUMENTS

| 2,694,537 | A | * | 11/1954 | Reichert | B64D 13/08 244/118.5 |
| 2,737,874 | A | * | 3/1956 | Gallay | B64D 13/08 165/216 |
| 4,674,704 | A | * | 6/1987 | Altoz | H05K 7/20136 244/1 R |
| 8,707,721 | B2 | * | 4/2014 | Scherer | B64D 13/00 62/239 |
| 8,973,393 | B2 | * | 3/2015 | Atkey | B64D 13/06 62/401 |

(Continued)

FOREIGN PATENT DOCUMENTS

| DE | 102007023685 | 10/2008 |
| DE | 102007019820 | 11/2008 |

(Continued)

OTHER PUBLICATIONS

German Search Report, dated Jul. 27, 2016, priority document.

*Primary Examiner* — Edelmira Bosques
*Assistant Examiner* — Phillip Decker
(74) *Attorney, Agent, or Firm* — Greer, Burns & Crain, Ltd.

(57) ABSTRACT

In a method for the ventilation of an aircraft area, air conveyed from an aircraft environment by a conveying device into an interior space of the aircraft is supplied during ground operation of the aircraft to the aircraft area to be ventilated. During flight mode of the aircraft, air flowing from the aircraft environment via a ram air duct into the interior space of the aircraft is supplied to the aircraft area to be ventilated. During flight mode of the aircraft, in addition to the air flowing from the aircraft environment via the ram air duct into the interior space of the aircraft, air conveyed from the aircraft environment by the conveying device into the interior space of the aircraft is supplied to the aircraft area to be ventilated when a flight velocity of the aircraft falls below a flight velocity threshold value.

4 Claims, 2 Drawing Sheets

(56) References Cited

U.S. PATENT DOCUMENTS

| | | | |
|---|---|---|---|
| 8,973,867 B2* | 3/2015 | Eichholz | B64C 7/00 244/53 B |
| 9,669,936 B1* | 6/2017 | Fiterman | B64D 13/06 |
| 2007/0125906 A1 | 6/2007 | Scherer et al. | |
| 2008/0148747 A1 | 6/2008 | Solntsev et al. | |
| 2009/0014593 A1 | 1/2009 | Westenberger et al. | |
| 2011/0111683 A1* | 5/2011 | Kelnhofer | B64D 13/006 454/76 |
| 2011/0136425 A1* | 6/2011 | Eichholz | B64D 13/00 454/76 |
| 2011/0183595 A1* | 7/2011 | Liebich | B64D 13/02 454/70 |
| 2015/0099444 A1* | 4/2015 | Le | B64D 13/06 454/76 |
| 2016/0288912 A1* | 10/2016 | Richardson | B64D 13/00 |
| 2018/0148182 A1* | 5/2018 | Fagundes | B64D 13/06 |

FOREIGN PATENT DOCUMENTS

| | | |
|---|---|---|
| DE | 102008025960 | 12/2009 |
| DE | 102008026117 | 12/2009 |
| WO | 2005063579 | 7/2005 |

* cited by examiner

METHOD AND SYSTEM FOR THE VENTILATION OF AN AIRCRAFT AREA

CROSS-REFERENCES TO RELATED APPLICATIONS

This application claims the benefit of the German patent application No. 10 2015 216 499.3 filed on Aug. 28, 2015, the entire disclosures of which are incorporated herein by way of reference.

BACKGROUND OF THE INVENTION

The present invention concerns a method and a system for the ventilation of an aircraft area.

On board an aircraft there are various areas in which exceeding of a predetermined temperature and the occurrence of a build-up of heat must be reliably avoided. In unpressurized aircraft areas in particular, which are used as installation space for thermally loaded devices, such as the air conditioning units or the electronic control components of the aircraft, for example, or as installation space for the aircraft undercarriage, adequate heat dissipation from these aircraft areas must be guaranteed by proper ventilation both in ground operation and in flight mode of the aircraft. Moreover, in unpressurized aircraft areas used as an installation space for thermally loaded devices, for example, an adequate exchange of air must be ensured to prevent heating of the aircraft structure and/or the formation of ignitable accumulations of fuel and/or fuel vapor.

Aircraft areas to be ventilated are normally supplied with ambient air via suitable ram air ducts. In flight mode of the aircraft, a static excess pressure, also described as ram pressure, builds up in a ram air duct compared with the ambient pressure, which excess pressure causes a flow of ambient air through the ram air duct into the aircraft area to be ventilated. In ground operation of the aircraft, on the other hand, a fan arranged in a bypass duct ensures an adequate ambient air flow into the aircraft area to be ventilated. A non-return valve arranged in the ram air duct here prevents a return flow of ambient air conveyed by the fan through the ram air duct to the aircraft environment. Such a ram-air-based ventilation system is described, for example, in DE 10 2008 025 960 B4 and US 2011/111683 A1 or DE 10 2007 023 685 B3 and U.S. Pat. No. 8,707,721 B2.

Furthermore, ram air duct arrangements with two inlets are known, in which one ram air inlet connected to a ram air duct is used to supply ambient air to an aircraft area to be ventilated in flight mode of the aircraft. Another air inlet is connected, on the other hand, via an air duct running initially parallel to the ram air duct and finally opening into the ram air duct, to the aircraft area to be ventilated and is used to supply ambient air to the aircraft area to be ventilated in ground operation of the aircraft. A fan arranged in the air duct ensures the conveying of ambient air through the air duct in this case, wherein a flow cross section constriction in the area of the opening of the air duct into the ram air duct prevents a flow of ambient air flowing through the air duct back into the aircraft environment through the ram air duct.

SUMMARY OF THE INVENTION

The present invention has the task of providing a method and a system for the ventilation of an aircraft area that facilitate a reduction in the air resistance of the aircraft in flight mode.

In a method for the ventilation of an aircraft area, air conveyed by a conveying device from an aircraft environment into an interior space of the aircraft is supplied to the aircraft area to be ventilated in ground operation of the aircraft. The term "ground operation" here describes an operation of the aircraft in which the aircraft is either standing on the ground or is moving at a velocity that is lower than a minimal aircraft-type-dependent flight velocity laid down for the aircraft. In flight mode of the aircraft, on the other hand, air flowing via a ram air duct from the aircraft environment into the interior space of the aircraft is supplied to the aircraft area to be ventilated. The term "flight mode" here describes an operation of the aircraft in which the aircraft is in the air and moving at a velocity that is greater than or equal to a minimal aircraft-type-dependent flight velocity laid down for the aircraft.

An actual air volume flow that can be supplied via the ram air duct to the interior space of the aircraft depends on the ram pressure building up in the ram air duct in flight mode of the aircraft, which pressure is determined, for its part, by the design of the ram air duct and the flight velocity of the aircraft. As the flight velocity of the aircraft increases and the ram pressure consequently rises in the ram air duct, an increasingly large air volume flow can thus be supplied to the aircraft area to be ventilated via the ram air duct. In ground operation of the aircraft, i.e., when the flight velocity of the aircraft is equal to zero and thus no ram pressure is present in the ram air duct, the aircraft area to be ventilated, on the other hand, is ventilated exclusively by the air conveyed by the conveying device into the interior space of the aircraft.

The safety and certification requirements that normally apply to air transport require that the supply of a minimum air volume flow into the aircraft area to be ventilated is ensured both in flight mode and in ground operation of the aircraft. The conveying device, which conveys ambient air into the aircraft area to be ventilated in ground operation of the aircraft, is therefore normally designed in such a way that it is able to convey the required minimum air volume flow into the aircraft area to be ventilated without being overdimensioned, however.

However, in the design of the ram air duct and in particular of a ram air duct inlet, the variation in the ram pressure building up in the ram air duct and thus in the actual air volume flow through the ram air duct as a function of the flight velocity of the aircraft is to be taken into account. Substantial design parameters of the ram air duct, which influence the actual air volume flow that can be supplied via the ram air duct to the interior space of the aircraft at a given flight velocity of the aircraft, are a free-flowing cross section of the ram air duct, for example, and in particular, a free-flowing cross section of a ram air duct inlet as well as a free-flowing cross section of a ram air duct outlet. It is generally the case that the greater the free-flowing cross section of the ram air duct and, in particular, the greater the free-flowing cross section of the ram air duct inlet, the greater the actual air volume flow flowing through the ram air duct at a given flight velocity of the aircraft.

Furthermore, the air volume flow actually conducted via the ram air duct from the aircraft environment into the interior space of the aircraft can be set and adapted, for example, to the ventilation requirement of the aircraft area to be ventilated by suitable control of a ram air inlet flap closing or releasing the ram air duct inlet of the ram air duct and of a ram air outlet flap closing or releasing the ram air duct outlet of the ram air outlet. It is the case here that the air resistance and thus the fuel consumption of the aircraft increase with an increasing free-flowing cross section of the ram air duct and in particular an increasing free-flowing cross section of the ram air duct inlet, as well as a rising air volume flow actually conducted through the ram air duct into the interior space of the aircraft. Therefore, a ram air duct that is optimized in respect of the additional air resistance caused by it has the smallest possible free-flowing cross section, especially in the area of the ram air duct inlet.

However, in order to guarantee an adequate supply of air to the aircraft area to be ventilated in flight mode of the aircraft, the ram air duct and, in particular the ram air duct inlet, must be dimensioned in such a way that, even if the aircraft is flying much slower in climbing or descent mode, for example, than in cruising mode, adequate ambient air flows through the ram air duct into the aircraft area to be ventilated. The ram air duct and, in particular the ram air duct inlet, are therefore normally designed for operation in climbing mode or in descent mode of the aircraft and are consequently significantly overdimensioned for operation in cruising mode of the aircraft.

In the method for the ventilation of an aircraft area, therefore, in addition to the air flowing from the aircraft environment via the ram air duct into the interior space of the aircraft in flight mode of the aircraft, air conveyed by the conveying device from the aircraft environment into the interior space of the aircraft is supplied to the aircraft area to be ventilated when a flight velocity of the aircraft falls below a flight velocity threshold value. In the method for the ventilation of an aircraft area, the flight velocity of the aircraft is thus used as a control parameter for controlling the operation of the conveying device. In particular, the conveying device is operated and used to supply additional air to the aircraft area to be ventilated when the flight velocity of the aircraft is lower than the flight velocity threshold value and thus the actual air volume flow that can be supplied to the interior space of the aircraft via the ram air duct is low in the case of the given ram air duct design.

For example, the conveying device may be operated in the starting phase of the aircraft during climbing mode or kept in operation until the flight velocity of the aircraft has attained the flight velocity threshold value. In a similar manner, the conveying device may be put into operation in the landing phase of the aircraft during descent mode as soon as the flight velocity of the aircraft falls below the flight velocity threshold value. Since the conveying device is used in the method for the ventilation of an aircraft area at a low flight velocity of the aircraft to compensate for the low actual air volume flow through the ram air duct at this flight velocity, the free-flowing cross section of the ram air duct and in particular the free-flowing cross section of the ram air duct inlet can be dimensioned much smaller than is possible if the ventilation requirement of the aircraft area to be ventilated has to be covered in flight mode of the aircraft exclusively by the air flowing through the ram air duct.

The method for the ventilation of an aircraft area thus facilitates an optimization of the ram air duct design in respect of the air resistance caused by the ram air duct and thus in respect of the fuel consumption of the aircraft. Major changes in the ram air duct architecture are not necessary for this. On the contrary, it is only necessary to implement the control described above of the conveying device by suitable adaptation of control software, in order to have the option of a suitable reduction in the free-flowing cross section of the ram air duct or of the ram air duct inlet. The reduction in the free-flowing cross section of the ram air duct or of the ram air duct inlet can be realized in a simple manner, for example by using a restrictor in the ram air duct or by the installation of a scaled-down ram air duct inlet. The method can thus be implemented even in existing aircraft.

The flight velocity threshold value may be a constant value, which remains the same in all operating phases of the aircraft. Control of the operation of the conveying device as a function of a constant flight velocity threshold value is comparatively simple to realize. Alternatively to this, however, it is also conceivable to control the operation of the conveying device as a function of a variable flight velocity threshold value. For example, control of the operation of the conveying device as a function of a variable flight velocity threshold value suggests itself if the air demand of the aircraft area to be ventilated varies sharply in different operating phases of the aircraft, for example.

The flight velocity threshold value is preferably a flight velocity of the aircraft at which a minimum air volume flow necessary to fulfil a ventilation requirement for the aircraft area to be ventilated is suppliable to the aircraft area to be ventilated via the ram air duct. In the case of such a selection of the flight velocity threshold value, the conveying device is consequently only operated if not enough air can be supplied via the ram air duct to the aircraft area to be ventilated at a given flight velocity to fulfil the ventilation requirement for the aircraft area to be ventilated. Unnecessary operation of the conveying device is thus avoided. At the same time, however, it is ensured that the ventilation requirement for the aircraft area to be ventilated is fulfilled in all operating phases of the aircraft, i.e., adequate air is supplied to the aircraft area to be ventilated in all operating phases of the aircraft.

The minimum air volume flow used to determine the flight velocity threshold value may be a constant value, which is determined, for example, by regulatory safety requirements or certification requirements. In the case of a constant minimum air volume flow independent of the operating phase of the aircraft, control of the operation of the conveying device is preferably carried out also as a function of a constant flight velocity threshold value. Alternatively to this, however, the minimum air volume flow used to determine the flight velocity threshold value may also vary, for example as a function of the operating phase of the aircraft, so that then control of the operation of the conveying device suggests itself as a function of a correspondingly variable flight velocity threshold value.

In a preferred embodiment of the method for the ventilation of an aircraft area, the flight velocity threshold value is a flight velocity of the aircraft at which the minimum air volume flow necessary to fulfil a ventilation requirement for the aircraft area to be ventilated is supplied to the aircraft area to be ventilated via the ram air duct. Such a selection of the flight velocity threshold value ensures that first the full capacity of the ram air duct is exploited to supply air to the aircraft area to be ventilated before the conveying device is used, in order to ensure proper ventilation of the aircraft area to be ventilated.

In particular, the flight velocity threshold value may be a minimal flight velocity of the aircraft at an altitude that corresponds to a maximal operating altitude of the conveying device. In a configuration of this kind of the method for the ventilation of an aircraft area, the maximal operating altitude of the conveying device, i.e., the maximal height above sea level at which the conveying device can be operated without problems, is first determined. In this case various design parameters of the conveying device as well as parameters specific to operating altitude, such as the reduced density of the air at great height, for example, which adversely affects the conveying capacity of the conveying device and the dissipation of the exhaust heat produced by the conveying device in operation, can be taken into consideration. Then the minimal flight velocity of the aircraft at an altitude corresponding to the maximal operating altitude of the conveying device is determined, which altitude varies from one type of aircraft to another, but is normally stated in the aircraft specification.

Operation of the conveying device as a function of a flight velocity threshold value, which is equal to the minimal flight velocity of the aircraft at an altitude corresponding to the maximum operating altitude of the conveying device, facilitates optimal utilization of the operating range of the conveying device without risking damage to the conveying device. The optimization potential for the configuration of the ram air duct and in particular of the ram air duct inlet can be fully exploited by this, i.e., the free-flowing cross section of the ram air duct and in particular of the ram air duct inlet can be reduced particularly far. At the same time, by taking account of the minimal flight velocity of the aircraft at the altitude corresponding to the maximal operating altitude of the conveying device, and consequently of the minimal ram air flow through the ram air duct at this flight velocity when determining the flight velocity threshold value, it is ensured that a proper supply of air to the aircraft area to be ventilated is always possible.

In principle, a ram air duct with any architecture can be used for executing the method. It is conceivable, for example, to ventilate an aircraft area using a ram air duct according to the method described above in which the conveying device is arranged in a bypass duct running parallel to the ram air duct. For example, the bypass duct accommodating the conveying device may branch off from the ram air duct upstream of the conveying device and open into the ram air duct again downstream of the conveying device. The terms "upstream" and "downstream" relate here to the flow direction of the ambient air through the bypass duct in operation of the conveying device. In a section of the ram air duct that is "bypassed" by the bypass duct, a non-return valve may be arranged that prevents the air conveyed through the bypass duct by the conveying device from flowing back through the ram air duct into the aircraft environment.

In an implementation of the method using a ram air duct of this kind, however, it should be taken into consideration that the conveying capacity of the conveying device depends on the pressure loss caused by the ram air duct inlet and thus on the free-flowing cross section of the ram air duct inlet. Consequently, to optimize the air resistance caused by the ram air duct, the free-flowing cross section of the ram air duct inlet can only be reduced to the extent that this is possible without excessively impairing the conveying capacity of the conveying device.

In a preferred embodiment of the method for the ventilation of an aircraft area, the conveying device therefore conveys air from the aircraft environment into the aircraft area to be ventilated via an air inlet formed separately from a ram air duct inlet. Due to this, the optimization potential that can be realized by the method for a reduction in the free-flowing cross section of the ram air duct and in particular of the ram air duct inlet can be fully exploited without impairing the conveying capacity of the conveying device. An air duct which accommodates the conveying device and is connected to the air inlet formed separately from the ram air duct inlet may open into the ram air duct downstream of the conveying device, wherein the term "downstream" refers here to the flow direction of the air through the air duct in operation of the conveying device. In the area of the opening of the air duct into the ram air duct, a constriction in the cross section of the ram air duct may be provided, which prevents air conveyed through the air duct by the conveying device from flowing back through the ram air duct into the aircraft environment.

A system for the ventilation of an aircraft area comprises a conveying device, which is configured to convey air from an aircraft environment to the aircraft area to be ventilated in ground operation of the aircraft. The system further comprises a ram air duct, which is configured to conduct air from the aircraft environment to the aircraft area to be ventilated in flight mode of the aircraft. A control device of the system is configured to control the operation of the conveying device in such a way that, in flight mode of the aircraft, in addition to the air flowing from the aircraft environment via the ram air duct into the interior space of the aircraft, air conveyed by the conveying device from the aircraft environment is supplied to the aircraft area to be ventilated when a flight velocity of the aircraft falls below a flight velocity threshold value.

The flight velocity threshold value is preferably a flight velocity of the aircraft at which a minimum air volume flow necessary to fulfil a ventilation requirement for the aircraft area to be ventilated is suppliable via the ram air duct to the aircraft area to be ventilated.

In particular, the flight velocity threshold value may be a flight velocity of the aircraft at which the minimum air volume flow necessary to fulfil a ventilation requirement for the aircraft area to be ventilated is supplied via the ram air duct to the aircraft area to be ventilated.

In a particularly preferred embodiment of the system, the flight velocity threshold value is a minimal flight velocity of the aircraft at an altitude that corresponds to a maximal operating altitude of the conveying device.

The conveying device is preferably configured to convey air from the aircraft environment into the aircraft area to be ventilated via an air inlet formed separately from the ram air duct inlet of the ram air duct.

BRIEF DESCRIPTION OF THE DRAWINGS

A preferred embodiment of the invention is now explained in greater detail with reference to the enclosed schematic drawing, in which.

DETAILED DESCRIPTION OF THE PREFERRED EMBODIMENTS

Figure 1:
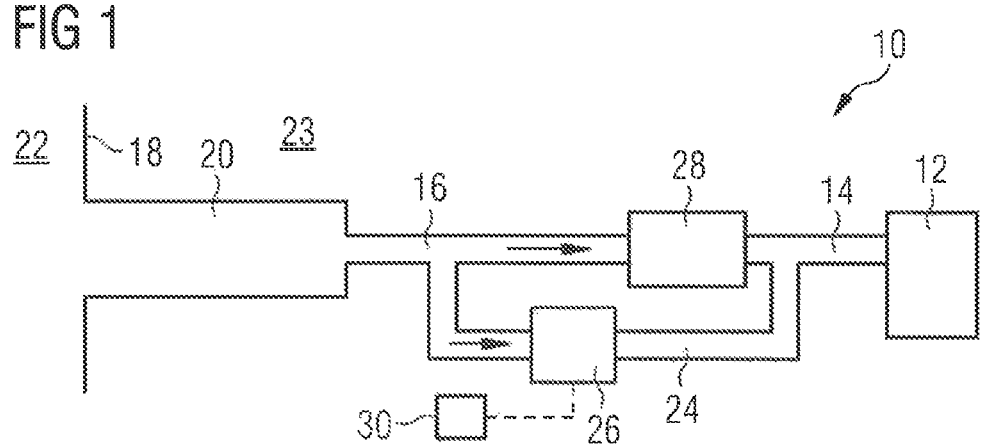
FIG. 1 shows a schematic overview representation of a system for the ventilation of an aircraft area and FIG. 2 shows a schematic overview representation of an alternative system for the ventilation of an aircraft area and FIG. 3 shows a diagram in which an actual air volume flow $Q_{actual}$ through a ram air duct is entered as a function of a flight velocity of an aircraft equipped with the ram air duct for three different ram air duct designs.

A system 10 illustrated in FIG. 1 for the ventilation of an aircraft area 12 comprises a ventilation air supply line 14, which is used to provide the aircraft area 12 to be ventilated with air. The aircraft area 12 to be ventilated may be a pack bay of the aircraft, for example, i.e., an aircraft area that is located in the region of a belly fairing of the aircraft and serves as an installation space for the air conditioning units of the aircraft air conditioning system (not illustrated in FIG. 1). However, the system 10 may be used for the ventilation of any other aircraft area to be supplied with ambient air both in ground operation and in flight mode of the aircraft.

The ventilation air supply line 14 is connected to a ram air duct 16. The ram air duct 16 comprises a ram air duct inlet 20 formed in an aircraft outer skin 18 and is used to supply air from an aircraft environment 22 to an interior space 23 of the aircraft in flight mode of the aircraft. The air supplied via the ram air duct 16 to the interior space 23 of the aircraft is conducted via the ventilation air supply line 14 into the aircraft area 12 to be ventilated. The system 10 further comprises an air duct 24, in which a conveying device 26 is arranged. The air duct 24 is formed in the form of a bypass duct, which branches off from the ram air duct 16 upstream of the conveying device 26 and opens into the ram air duct 16 again downstream of the conveying device 26. The terms "upstream" and "downstream" refer here to the flow direction of the ambient air through the air duct 24 formed as a bypass duct in operation of the conveying device 26.

In operation, the conveying device 26 conveys air from the aircraft environment 22 via the ram air duct inlet 20 into the interior space 23 of the aircraft. The air conveyed by the conveying device 26 is then conducted via the air duct 24 into the ventilation air supply line 14 and from there into the aircraft area 12 to be ventilated. A non-return (one-way) valve 28 arranged in the ram air duct 16 prevents air conveyed by the conveying device 26 through the air duct 24 in the direction of the aircraft area 12 to be ventilated from flowing back into the aircraft environment 22 through the ram air duct 16. The operation of the conveying device 26 is controlled by means of a control device 30 in the form of an electronic control unit, for example.

The aircraft area 12 to be ventilated must be ventilated adequately both in ground operation and in flight mode of the aircraft. This is guaranteed if a minimum air volume flow $Q_{min}$ necessary to fulfil a ventilation requirement for the aircraft area 12 to be ventilated is supplied to the aircraft area 12 to be ventilated. The minimum air volume flow $Q_{min}$ to be supplied to the aircraft area 12 to be ventilated may be a constant value or vary as a function of the operating phase of the aircraft, for example if the aircraft area 12 has to be ventilated to a different extent in different operating phases of the aircraft.

In ground operation of the aircraft, air conveyed exclusively by means of the conveying device 26 from the aircraft environment 22 into the interior space 23 of the aircraft is supplied to the aircraft area 12 to be ventilated via the ventilation air supply line 14. In flight mode of the aircraft, on the other hand, the ram air duct 16 is used to conduct air from the aircraft environment 22 into the interior space 23 of the aircraft, which air is then supplied to the aircraft area 12 to be ventilated via the ventilation air supply line 14.

An actual air volume flow $Q_{actual}$ that is suppliable via the ram air duct 16 to the interior space 23 of the aircraft depends on the ram pressure building up in the ram air duct 16 in flight mode of the aircraft, which pressure is determined for its part by the design of the ram air duct 16 and the flight velocity v of the aircraft. This relationship is illustrated in FIG. 3, which shows a diagram of the actual air volume flow $Q_{actual}$ through a ram air duct 16 as a function of the flight velocity v of an aircraft equipped with the ram air duct 16 for three different ram air duct designs A, B and C.

It is generally the case that as the flight velocity v of the aircraft increases and consequently the ram pressure in the ram air duct 16 increases, an increasing air volume flow can be conducted through the ram air duct 16. All three curves illustrated in FIG. 3 therefore have a rising curve initially as the flight velocity v increases. Above a flight velocity $v_{limit}$, a further increase in the actual air volume flow $Q_{actual}$ through the ram air duct 16 as a function of the flight velocity v is no longer possible, as the ram pressure in the ram air duct 16 and a maximal air volume flow $Q_{maxA}$, $Q_{maxB}$, $Q_{maxC}$ through the ram air duct 16 is limited by the geometry of the ram air duct 16 at flight velocities exceeding the value $v_{limit}$. Above the flight velocity $v_{limit}$, therefore, all three curves A, B and C run horizontally.

To ensure that the minimum air volume flow $Q_{min}$, which is assumed here for the sake of simplicity to be a constant value, is supplied to the aircraft area 12 to be ventilated in all operating phases of the aircraft, the conveying device 26 is designed so that in ground operation of the aircraft it is able to convey the required minimum air volume flow $Q_{min}$ into the aircraft area 12 to be ventilated. However, overdimensioning of the conveying device 26 going beyond normal safety margins and tolerances is not necessary. The term "ground operation" here describes an operation of the aircraft in which the aircraft is either standing on the ground or is moved at a velocity v that is lower than a minimal aircraft-type-dependent flight velocity laid down for the aircraft.

Figure 3:
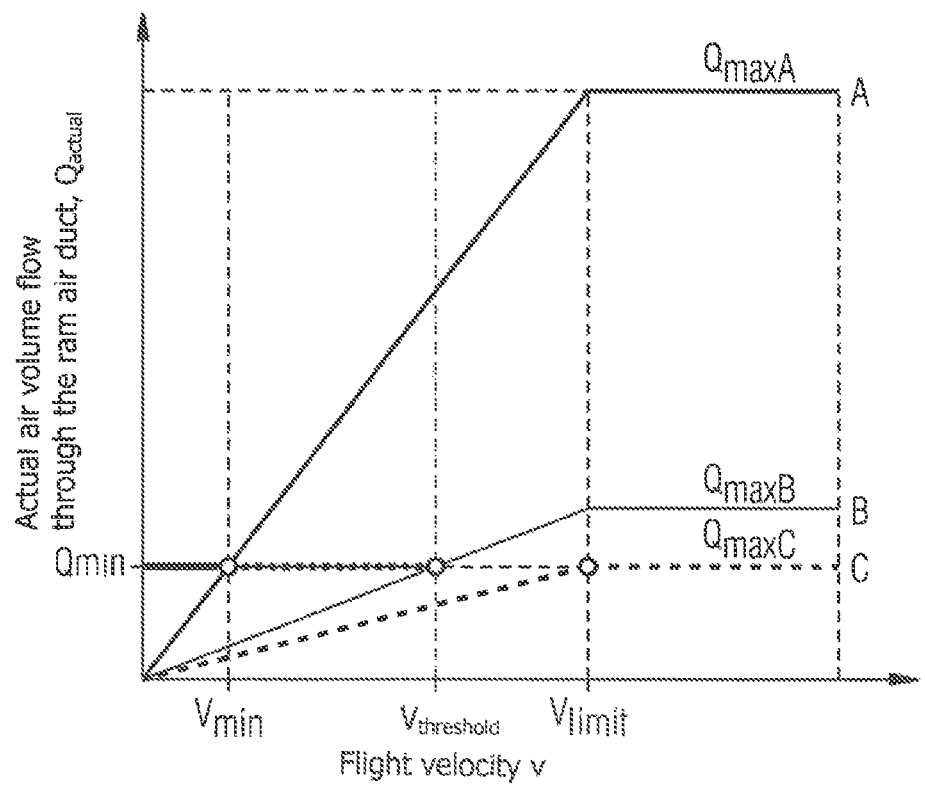

In the design of the ram air duct 16 and in particular of the ram air duct inlet 20, however, the variation illustrated in FIG. 3 of the actual air volume flow $Q_{actual}$ through the ram air duct 16 as a function of the flight velocity v of the aircraft is to be taken into consideration. A conventional ram air duct 16, the through-flow behavior of which is represented by the curve A in FIG. 3, is dimensioned in such a way that the aircraft area 12 to be ventilated can be ventilated in flight mode of the aircraft exclusively by air that is supplied to the interior space 23 of the aircraft via the ram air duct 16. The term "flight mode" here describes an operation of the aircraft in which the aircraft is in the air and moves at a velocity v that is greater than or equal to an aircraft-type-dependent minimal flight velocity $v_{min}$ laid down for the aircraft.

To ensure this, the conventional ram air duct 16 according to curve A, and in particular its ram air duct inlet 20, are dimensioned in such a way that the actual air volume flow $Q_{actual}$ through the ram air duct 16 immediately corresponds to the minimum air volume flow $Q_{min}$ to the aircraft area 12 to be ventilated when the aircraft attains the aircraft-type-dependent minimal flight velocity $v_{min}$, i.e., passes from ground operation into flight mode. However, for the predominant operating time of the aircraft and, in particular, the operation of the aircraft in cruising mode, the conventional ram air duct 16 and in particular its ram air duct inlet 20 are clearly overdimensioned.

In contrast to this, curve C in FIG. 3 shows the through-flow behavior of a ram air duct 16 that is designed for operation in cruising mode of the aircraft, that is, it only delivers the minimum air volume flow $Q_{min}$ to the aircraft area 12 to be ventilated when the aircraft is flying in cruising flight mode at the velocity $v_{limit}$. Although a ram air duct 16 of this kind would have a very much lower air resistance than a conventional ram air duct 16 on account of its substantially smaller free-flowing cross section and, in particular, its substantially smaller ram air duct inlet 20, it would not be able to deliver sufficient air to supply the aircraft area 12 to be ventilated when the aircraft is flying slower than at the velocity $v_{limit}$, which is the case in climbing and descent mode, for example.

The ram air duct 16 installed in the exemplary system 10 is therefore designed in such a way that it has the through-flow behavior represented by curve B in FIG. 3. In particular, the ram air duct 16 and in particular its ram air duct inlet 20 is dimensioned in such a way that the actual air volume flow $Q_{actual}$ through the ram air duct 16 corresponds to the minimum air volume flow $Q_{min}$ to the aircraft area 12 to be ventilated as soon as the flight velocity v of the aircraft attains a flight velocity threshold value $v_{threshold}$. In other words, the aircraft area 12 to be ventilated can be provided exclusively with air supplied by the ram air duct 16 to the interior space 23 of the aircraft as soon as the aircraft is flying in flight mode at a flight velocity corresponding to the flight velocity threshold value $v_{threshold}$.

Since the ram air duct 16 does not deliver an actual air volume flow $Q_{actual}$ corresponding to the minimum air volume flow $Q_{min}$ to the aircraft area 12 to be ventilated already on attaining the minimal flight velocity $v_{min}$ that defines the beginning of the flight mode, the ram air duct 16 with the through-flow behavior represented by curve B in FIG. 3 can be dimensioned much smaller than the conventional ram air duct 16 with the through-flow behavior represented by curve A in FIG. 3. The ram air duct 16 with the through-flow behavior according to curve B therefore causes a much lower air resistance than the ram air duct 16 with the through-flow behavior according to curve A. An aircraft equipped with the ram air duct 16 with the through-flow behavior according to curve B therefore has a lower fuel consumption than an aircraft equipped with the ram air duct 16 with the through-flow behavior according to curve A.

As is evident from the progression of curve B in FIG. 3, the actual air volume flow $Q_{actual}$ through the ram air duct 16 at a flight velocity v falling below the flight velocity threshold value $v_{threshold}$ is lower than the minimum air volume flow $Q_{min}$ to the aircraft area 12 to be ventilated, i.e., the aircraft area 12 to be ventilated cannot be supplied in this operating phase of the aircraft exclusively with air that flows through the ram air duct 16 into the interior space 23 of the aircraft. To compensate for this and ensure a proper provision of the aircraft area 12 to be ventilated with air in all operating phases of the aircraft, the control device 30 controls the operation of the conveying device 26 in such a way that, in addition to the air flowing into the interior space 23 of the aircraft via the ram air duct 16, air conveyed by the conveying device 26 from the aircraft environment 22 is supplied to the aircraft area 12 to be ventilated in flight mode of the aircraft if the flight velocity v of the aircraft falls below the flight velocity threshold value $v_{threshold}$.

In other words, unlike the case of an aircraft equipped with a conventional ram air duct 16, in which the conveying device 26 is switched off as soon as the aircraft is in flight mode, i.e., is moving in the air at a velocity v, which is greater than or equal to the minimal flight velocity $v_{min}$, in the case of an aircraft that is equipped with the ram air duct 16 with the through-flow behavior represented by the curve B in FIG. 3, the conveying device 26 is used also in flight mode of the aircraft to convey air to the aircraft area 12 to be ventilated as long as the flight velocity v of the aircraft is lower than the flight velocity threshold value $v_{threshold}$. For example, the conveying device 26 may be operated in the starting phase of the aircraft during climbing mode or kept in operation until the flight velocity v of the aircraft has attained the flight velocity threshold value $v_{threshold}$. In a similar manner, the conveying device 26 may be put into operation in the landing phase of the aircraft during the descent as soon as the flight velocity v of the aircraft falls below the flight velocity threshold value $v_{threshold}$.

In particular, the ram air duct 16 installed in the exemplary system 10 is designed in such a way that the flight velocity threshold value $v_{threshold}$ is a minimal flight velocity of the aircraft at an altitude that corresponds to a maximal operating altitude of the conveying device 26. When dimensioning the ram air duct 16, the maximum operating altitude of the conveying device 26, i.e., the maximum height above sea level at which the conveying device 26 can be operated without problems, is thus determined initially. Then the minimal flight velocity of the aircraft at an altitude corresponding to the maximal operating altitude of the conveying device 26 is determined, which velocity varies from aircraft type to aircraft type, but is normally laid down in the aircraft specification. Finally, the flight velocity threshold value $v_{threshold}$ is set equal to this minimal flight velocity of the aircraft in the maximum operation altitude of the conveying device 26.

An operation of the conveying device 26 as a function of a flight velocity threshold value $v_{threshold}$, which is equal to the minimal flight velocity of the aircraft at an altitude corresponding to the maximal operating altitude of the conveying device, facilitates optimal utilization of the operating range of the conveying device 26 without risking damage to the operating device. Due to this, the optimization potential for configuring the ram air duct 16 and in particular the ram air duct inlet 20 can be fully exploited.

Figure 2:
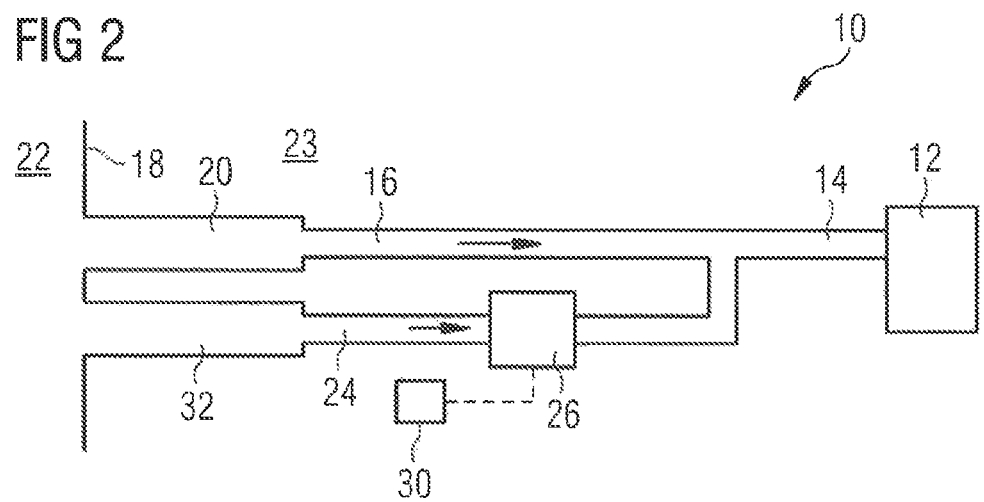

The system 10 illustrated in FIG. 2 differs from the system 10 according to FIG. 1 only in that the conveying device 26 is integrated not into an air duct 24 in the form of a bypass duct, but into an air duct 24, which is connected to an air inlet 32 formed in the aircraft outer skin 18 separately from the ram air duct inlet 20 and opens downstream of the conveying device 26 into the ram air duct 16. Instead of a non-return valve 24, a flow cross section constriction in the area of the opening of the air duct 24 into the ram air duct 16 here prevents ambient air flowing through the air duct 24 from flowing back through the ram air duct 16 into the aircraft environment 22 in operation of the conveying device 26. With an architecture of this kind, the conveying capacity of the conveying device 26 is independent of the pressure loss caused by the ram air duct inlet 20 and thus of the free-flowing cross section of the ram air duct inlet 20. Due to this, the optimization potential realizable by the operating method described above can be fully exploited for a reduction in the free-flowing cross section of the ram air duct 16 and in particular of the ram air duct inlet 20 without impairing the conveying capacity of the conveying device 26.

The construction and mode of operation of the system 10 according to FIG. 2 otherwise correspond to the construction and operating mode of the system 10 shown in FIG. 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for the ventilation of an aircraft area, comprising the steps:

during ground operation of the aircraft, supplying air from an aircraft environment into an interior space of the aircraft by a conveying device to the aircraft area to be ventilated via an air duct which opens downstream of the conveying device into a ram air duct, and during flight mode of the aircraft, supplying air flowing from the aircraft environment into the interior space of the aircraft via the ram air duct to the aircraft area to be ventilated, while simultaneously during flight mode of the aircraft, when a flight velocity of the aircraft falls below a flight velocity threshold value, in addition to supplying the air flowing from the aircraft environment via the ram air duct into the interior space of the aircraft, supplying air conveyed from the aircraft environment by the conveying device via the air duct into the interior space of the aircraft to the aircraft area to be ventilated, so that air flow is supplied to the interior space of the aircraft from both the ram air duct and the conveying device, wherein the flight velocity threshold value is a minimal flight velocity of the aircraft at an altitude that corresponds to a maximal operating altitude of the conveying device.

2. The method according to claim 1, wherein the conveying device conveys air from the aircraft environment via an air inlet formed separately from a ram air duct inlet of the ram air duct into the aircraft area to be ventilated.

3. A system for the ventilation of an aircraft area comprising:

a conveying device configured to convey air from an aircraft environment into the aircraft area to be ventilated during ground operation of the aircraft, a ram air duct configured to conduct air from the aircraft environment to the aircraft area to be ventilated during flight mode of the aircraft, an air duct, in which the conveying device is arranged, and which opens downstream of the conveying device into the ram air duct, and a control device configured to control the operation of the conveying device in such a way that, in flight mode of the aircraft, when a flight velocity of the aircraft falls below a flight velocity threshold value, the air flowing from the aircraft environment via the ram air duct into the interior space of the aircraft occurs at the same time as air conveyed from the aircraft environment by the conveying device via the air duct, and, wherein the flight velocity threshold value is a minimal flight velocity of the aircraft at an altitude that corresponds to a maximal operating altitude of the conveying device.

4. The system according to claim 3, wherein the conveying device is configured to convey air from the aircraft environment via an air inlet formed separately from a ram air duct inlet of the ram air duct into the aircraft area to be ventilated.

* * * * *